(12) United States Patent
Nakaoka et al.

(10) Patent No.: US 8,749,664 B2
(45) Date of Patent: Jun. 10, 2014

(54) IMAGE PROCESSING APPARATUS AND IMAGE PROCESSING METHOD

(75) Inventors: Hiroshi Nakaoka, Kawaguchi (JP); Kazuya Ino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 12/341,881

(22) Filed: Dec. 22, 2008

(65) Prior Publication Data

US 2009/0167894 A1    Jul. 2, 2009

(30) Foreign Application Priority Data

Dec. 28, 2007  (JP) .................................. 2007-340390

(51) Int. Cl.
*H04N 9/73* (2006.01)
(52) U.S. Cl.
USPC .................................... 348/228.1; 348/226.1
(58) Field of Classification Search
USPC .................................... 348/296, 226.1–228.1
See application file for complete search history.

(56) References Cited

U.S. PATENT DOCUMENTS

| | | | | |
|---|---|---|---|---|
| 6,661,451 | B1 * | 12/2003 | Kijima et al. ............... | 348/220.1 |
| 6,710,818 | B1 * | 3/2004 | Kasahara et al. ........... | 348/226.1 |
| 7,034,870 | B2 * | 4/2006 | Nagaoka et al. ............ | 348/228.1 |
| 7,142,234 | B2 | 11/2006 | Kaplinsky | |
| 7,187,405 | B2 | 3/2007 | Poplin | |
| 7,683,941 | B2 * | 3/2010 | Dakemoto et al. .......... | 348/226.1 |
| 2003/0142239 | A1 * | 7/2003 | Yoshida et al. ............. | 348/607 |
| 2004/0001153 | A1 * | 1/2004 | Kikukawa et al. .......... | 348/226.1 |
| 2006/0221205 | A1 * | 10/2006 | Nakajima et al. ........... | 348/226.1 |
| 2006/0232686 | A1 | 10/2006 | Ono | |
| 2007/0153094 | A1 | 7/2007 | Noyes | |

FOREIGN PATENT DOCUMENTS

| | | |
|---|---|---|
| EP | 1566962 A1 | 8/2005 |
| JP | 11-122513 A | 4/1999 |
| JP | 2005-101792 A | 4/2005 |
| JP | 2007-060585 A | 3/2007 |

* cited by examiner

*Primary Examiner* — Sinh Tran
*Assistant Examiner* — Jason Flohre
(74) *Attorney, Agent, or Firm* — Canon U.S.A., Inc. IP Division

(57) ABSTRACT

An image processing apparatus includes a change unit configured to change a driving state of an image sensor for capturing an image signal in response to an operation for changing the driving state of the image sensor, and a flicker correction unit configured to correct an image signal based on a flicker component detected from image signals of a frame captured a predetermined number of frames before the frame of the image signal to be corrected, wherein the flicker correction unit is configured to change the predetermined number when the driving state of the image sensor is changed by the change unit.

5 Claims, 8 Drawing Sheets

FIG.8A

IMAGE PROCESSING APPARATUS AND IMAGE PROCESSING METHOD

BACKGROUND OF THE INVENTION

1. Field of the Invention

The present invention relates to a technique to correct a flicker component in an image captured using an image sensor.

2. Description of the Related Art

In an imaging apparatus employing an image sensor, periodic light and dark changes may appear in a captured image when an object under fluorescent lighting is continuously photographed for a plurality of frames (or fields) as a moving image or continuous still images. This phenomenon is referred to as a fluorescent flicker, which occurs due to a difference between the frequency of the commercial power supply and a vertical synchronizing frequency of the imaging apparatus.

Conventionally, a technique has been proposed which detects a periodic fluctuation component of a signal level (hereafter referred to as a flicker component) and corrects a flicker by applying the inverse gain of the detected flicker component to the image signal (refer to Japanese Patent Application Laid-Open No. 11-122513).

The flicker component of a fluorescent flicker in an imaging apparatus varies depending on the frequency of the power supply and the light emission properties. Furthermore, a driving state of an imaging apparatus, such as accumulation time and a frame rate of an image sensor and a change in reading time due to an adding process and a thinning process of pixels, also causes variation in the flicker component. The driving state of an imaging apparatus is changed or controlled by an imaging system or in response to instructions from a user. Therefore, the driving state can rapidly change. In this case, the flicker component can significantly change with a change in the driving state.

However, a correction method discussed in Japanese Patent Application Laid-Open No. 11-122513 is a method of detecting a flicker component using an intensity distribution in the vertical direction generated by integrating an image signal of the current and past frames (or fields) in the horizontal direction. In such a method, it is difficult to follow an abrupt change in flicker component and to appropriately correct a flicker, because a time difference occurs between an image signal used to detect the flicker and an image signal to be corrected. Thus, it is difficult to execute suitable correction for a flicker. On the contrary, the correction can sometimes adversely affect a captured image.

SUMMARY OF THE INVENTION

Exemplary embodiments of the present invention are directed to an image forming apparatus and an image processing method capable of correcting a flicker component precisely even if the flicker component is abruptly changed due to a change in driving method of an image sensor.

According to an aspect of the present invention, an image processing apparatus includes a change unit configured to change a driving state of an image sensor for capturing an image signal in response to an operation for changing the driving state of the image sensor, and a flicker correction unit configured to correct an image signal based on a flicker component detected from image signals of a frame captured a predetermined number of frames before the frame of the image signal to be corrected, wherein the flicker correction unit is configured to change the predetermined number when the driving state of the image sensor is changed by the change unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
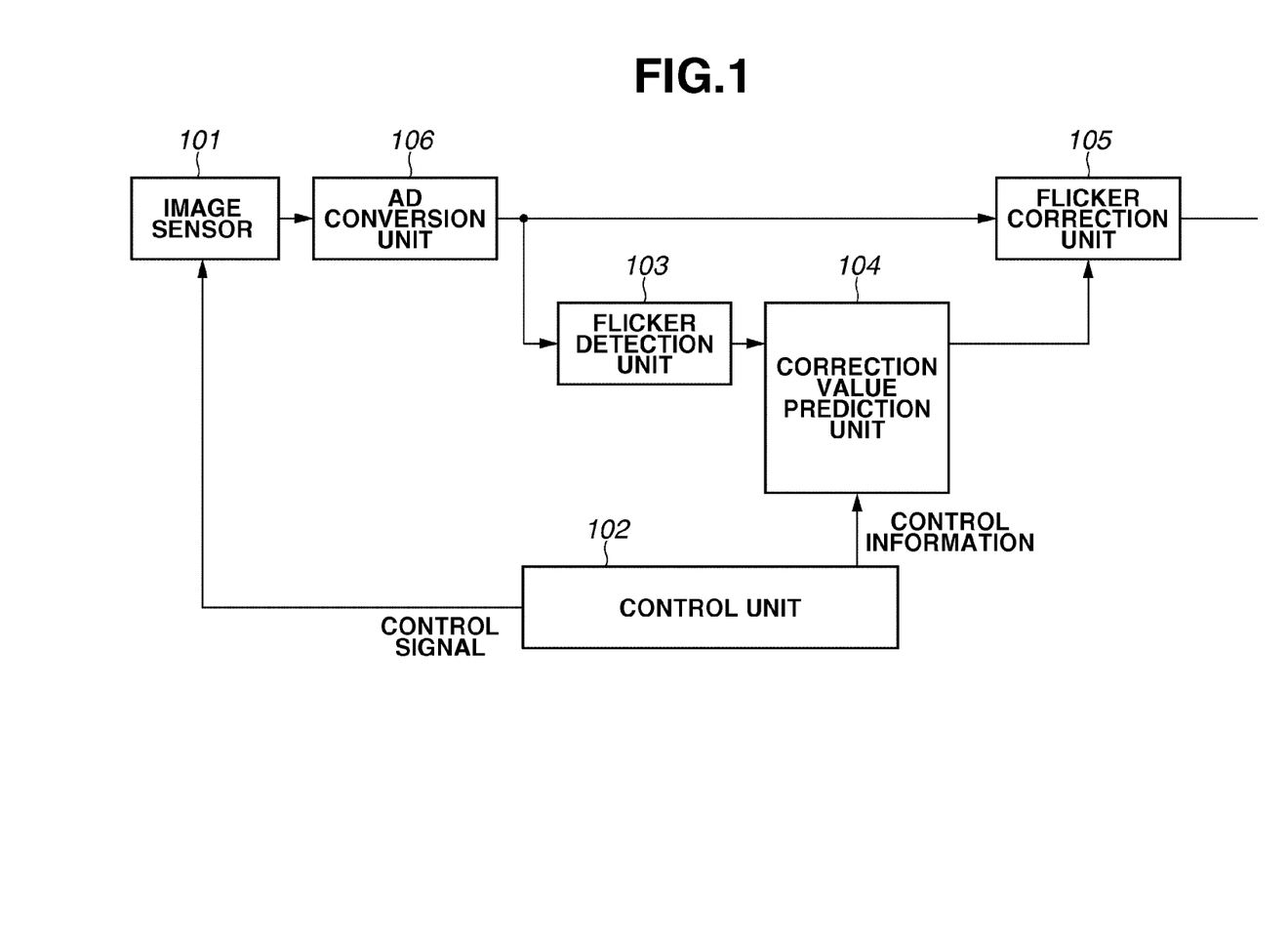
FIG. 1 is a block diagram illustrating a configuration of a flicker detection and correction apparatus according to a first exemplary embodiment of the present invention.

FIG. 1 is a block diagram illustrating a flicker detection and correction apparatus serving as an image processing apparatus according to a first exemplary embodiment of the present invention.

An image sensor 101 includes a photoelectric conversion elements. The image sensor 101 is driven by a driving pulse generated based on a control signal that is generated by a control unit 102, and converts an object image into an electric signal by photoelectric converting, and outputs the converted analog signal to an AD conversion unit 106. The AD conversion unit 106 converts the input analog signal into a digital signal and outputs it as a digital signal. At this time, if the image sensor 101 has an electronic shutter function, required exposure time can be assured under the control of a control signal from the control unit 102. A flicker detection unit 103 detects a flicker component from a variation component of a signal level, which is included in an image signal output from the AD conversion unit 106 and caused by a flashing light source.

The control unit 102 controls the entire system. The control unit 102 outputs a control signal for controlling a accumulation time of the image sensor 101 and outputs a control state of the image sensor 101 as control information to a correction value prediction unit 104, which will be described below.

The correction value prediction unit 104 generates a correction value for correction so that a variation component of a signal level being generated in an image signal does not appear, based on the flicker component detected in the flicker detection unit 103 and on the control information output from the control unit 102 for controlling the image sensor 101.

A flicker correction unit 105 executes arithmetic processing for an image signal based on the correction value generated in the correction value prediction unit 104 and suppresses a flicker included in an image signal.

Next, referring to FIG. 2, a timing chart according to the first exemplary embodiment of the present invention will be described.

A vertical synchronizing signal 201 changes according to a type of an imaging apparatus. Reading drive of the image sensor 101 is represented by r1 to r7. In the present exemplary embodiment, a complementary metal-oxide semiconductor (CMOS) image sensor is employed as the image sensor 101, which employs an XY address type scanning method.

Figure 2:
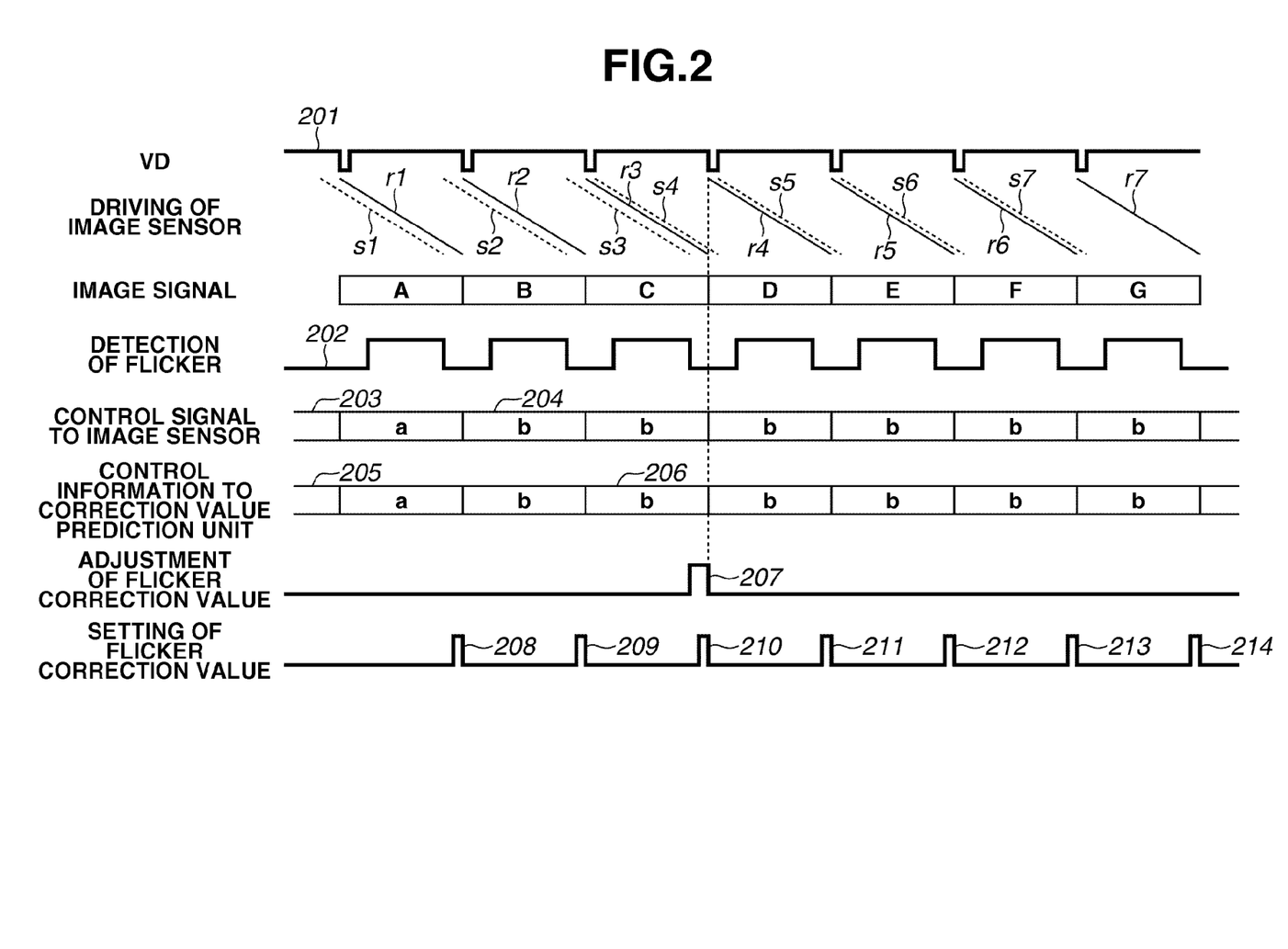
FIG. 2 is a timing chart illustrating the timing from flicker detection to flicker correction according to the first exemplary embodiment.

In the case of an image sensor of the XY address type scanning method, since an exposure for each pixel is sequentially executed along a line direction, as shown in FIG. 2, all pixels of the image sensor 101 are sequentially read during a period of one vertical synchronizing signal.

In addition, s1 to s7 represent driving to reset an electric charge accumulated on an electric charge conversion unit of the image sensor 101. In order to standardize an exposure time of each pixel, a resetting operation is also sequentially executed in a line direction similar to reading drive.

The time interposed between s (illustrated by a dotted line) and r (illustrated by a solid line) shown in FIG. 2 indicates an accumulation time of the image sensor 101. An image signal from A to C, in FIG. 2, is output as an image signal having a shorter accumulation time and an image signal from D to G is output as an image signal having a longer accumulation time.

A timing signal 202 indicates the timing when the flicker detection unit 103 executes a processing operation. The flicker detection unit 103 executes a detection operation in a part of a period when an image signal is being read.

A timing signal 203 indicates the timing when the control unit 102 outputs a control signal to the image sensor 101 for controlling thereof. In the case shown in FIG. 2, at timing 204, the control unit 102 outputs a control signal b to control the accumulation time for acquiring the image signal D to the image sensor 101.

A timing signal 205 indicates the timing when the control unit 102 outputs control information for the image sensor 101 to the correction value prediction unit 104. The control information is output with a delay by one vertical synchronizing period compared with the timing when the control unit 102 outputs a control signal to the image sensor 101. In the case illustrated in FIG. 2, the control unit 102 outputs the control signal b to the image sensor 101 at timing 204, while the control unit 102 outputs the control signal b to the correction value prediction unit 104 at timing 206. This allows the accumulation time when the image signal D is captured to be referred to when a correction value to correct the image signal D is to be generated.

A timing 207 indicates the timing when the correction value prediction unit 104 predicts a correction value based on the control information obtained from the control unit 102 and a flicker component obtained from the flicker detection unit 103. In FIG. 2, the image sensor 101 is driven so as to abruptly change the accumulation time between image signals C and D. The correction value prediction unit 104 receives control information which has been used to obtain the image signal, which is an object for flicker detection, and continuously compares control information one vertical synchronizing period before and control information to be obtained next. Then, when the control information is changed, the correction value prediction unit 104 operates so as to execute a prediction of a correction value.

Each of timings 208 to 214 indicates a timing when the correction value prediction unit 104 sets a generated correction value to the flicker correction unit 105. That is, the correction value prediction unit 104 operates to generate a correction value based on a flicker component obtained from the flicker detection unit 102 when the control information is not changed. On the other hand, the correction value prediction unit 104 operates to predict, based on a flicker component obtained from the flicker detection unit 102 and control information output from the control unit 102 to generate a correction value when the control information is changed. The set correction value is updated by the next vertical synchronizing signal and the correction operation is performed on a next image signal that is read from the image sensor 101. In the case of FIG. 2, timing 210 indicates the timing when the correction value to be predicted and generated is set.

Next, a flicker component output from the flicker detection unit 103 will be described together with an example of a detection operation.

Figure 3A:
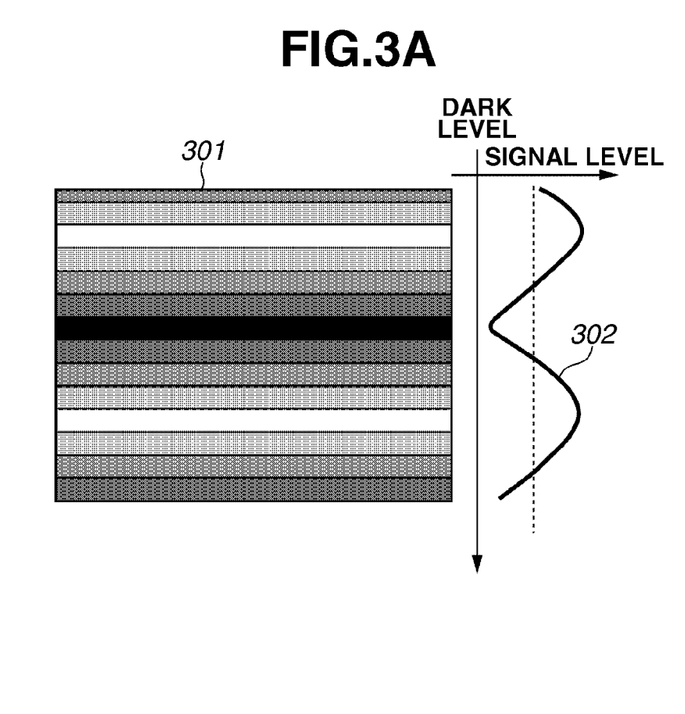
FIGS. 3A and 3B are schematic views illustrating a state of a flicker in an image signal due to an accumulation time difference according to the first exemplary embodiment.
Figure 3B:
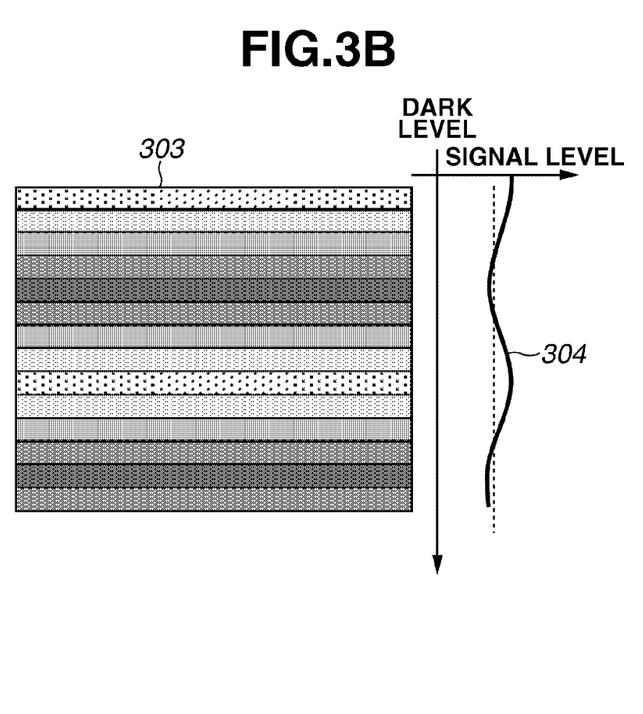

FIGS. 3A and 3B schematically illustrate an image signal captured by the image sensor 101. A state of an image signal 301 is obtained in a case when the accumulation time of the image sensor 101 is shorter. A state of an image signal 303 is obtained in a case when the accumulation time of the image sensor 101 is longer. Since a signal level is modulated by a flashing light source, a periodic level variation caused by a light emission cycle of the flashing light source is generated in an image signal as indicated in signal level graphs 302 and 304. A periodic variation of a signal level at this time dimension is converted into a frequency range to be detected, thereby allowing a flicker component included in an image signal to be extracted.

There are several methods for converting an image signal obtained from the image sensor 101 into a frequency range. With respect to data sampled at a fixed time period as an image signal, discrete Fourier transform is most commonly used to convert an image signal into a frequency range. A method will be described below in which an image signal is converted into a frequency range using discrete Fourier transform to calculate a flicker component.

A flicker caused by a flashing light source appears to form light and dark stripes arranged in the vertical direction caused by the driving system of the image sensor 101 (refer to FIGS. 3A and 3B). Therefore, sampling data generated in the vertical direction in an image signal is enough to detect a flicker component. For example, there is a method to average a signal for each horizontal line and reduce the signal into two-dimensional information of a time axis (time sampling) and a signal level as illustrated by the signal level graphs 302 and 304. Alternatively, without limiting to these methods, when a flicker at the center of an image signal causes a user to feel uncomfortable, a detection area can be arranged at the center of an image to average a signal for each horizontal direction in the detection area. In any case, data reduced into two-dimensional information of a time axis (time sampling) and a signal level is generated.

Further, when the video signal type is National Television Standards Code (NTCS) and the frequency of the commercial power supply is 50 Hz, since a flicker cycle which appears in an image signal is 100/60≈1.7 cycles, it is sufficient to sample all or a portion of one cycle or more in the vertical direction of an image signal. Also, when the video signal type is Phase Alternation by Line (PAL) and the frequency of the commercial power supply is 60 Hz, since a flicker cycle is a 120/50=2.4 cycles, similarly, it is sufficient to sample all or a portion of one cycle or more in the vertical direction of an image signal.

Next, an example will be described which converts the obtained sampling data into a frequency range. When a population parameter of sampling is N and sampled data is Xn (n=0, 1, ... N−1), data is discrete Fourier transformed into a frequency range using a discrete Fourier coefficient represented by the following equation:

$$\tilde{x}_k = \frac{1}{N}\sum_{n=0}^{N-1} x_n \cdot \exp\left(-i \cdot \frac{2\pi n k}{N}\right) \quad (1)$$

$$(k = 0, 1 \ldots N-1)$$

When data is sampled N times each for time L (sec) and a sampling interval is provided by a (sec), a Fourier coefficient after discrete Fourier transform is determined within a range of a discrete frequency fk represented by the following equation:

$$f_k = \frac{k}{N} \times f_s \quad \left(f_s = \frac{1}{a} = \frac{N}{L}\right) \quad (2)$$

where fs is a sampling frequency in a time domain.

Since a data row sampled from an image signal is a real-time signal, if equation (1) is expanded, equation (1) can be separated into a real part (Re) and an imaginary part (Im) and is represented by the following equation:

$$\tilde{x}_k = \text{Re}(\tilde{x}_k) + j \times \text{Im}(\tilde{x}_k) \quad (3)$$

$$\text{Re}(\tilde{x}_k) = \frac{1}{N}\sum_{n=0}^{N-1} x_n \cdot \cos\left(\frac{2\pi n k}{N}\right) \; \text{Im}(\tilde{x}_k) = -\frac{1}{N}\sum_{n=0}^{N-1} x_n \cdot \sin\left(\frac{2\pi n k}{N}\right) \quad (4)$$

An amplitude spectrum Ak in a certain frequency fk is determined by the following equation according to equation (4).

$$|A_k| = \sqrt{\text{Re}(\tilde{x}_k)^2 + \text{Im}(\tilde{x}_k)^2} \quad (5)$$

Further, a phase component Ωk in a certain frequency fk when converted into a frequency range is determined by the following equation according to equation (4).

$$\Omega_k = \tan^{-1}\left(-\frac{\text{Im}(\tilde{x}_k)}{\text{Re}(\tilde{x}_k)}\right) \quad (6)$$

From equation (5) and equation (6), it is understood that equation (4) contains a frequency component as a flicker component and a phase component corresponding to the frequency component, and represents a flicker component that is output from the flicker detection unit 103 to the correction value prediction unit 104.

Next, a method will be described which predicts a correction parameter based on a flicker component (amplitude and phase at each frequency) obtained from the above-described flicker detection unit 103 and control information on the image sensor 101 obtained from the control unit 102 in the correction value prediction unit 104.

Specifically, a method will be described in which when the driving state of the image sensor 101 is not changed, for example in FIG. 2, a flicker component in an image signal B is detected to generate a correction value for correcting an image signal C. As described above, it is known that a flicker, which is generated due to a flashing light source, appears in an image signal with a double frequency of a power supply frequency. For example, when the imaging apparatus is an NTSC type and the power supply frequency is 50 Hz, a flicker repeatedly appears for every three fields in the same phase.

Hence, a phase difference θk between a phase of a flicker component of a flicker generated in the image signal C and a phase of a flicker component of a flicker generated in an image signal D is represented by the following equation at k provided when a frequency fk calculated by equation (2) is fk=100 (Hz) and m provided when the phase difference θk represented by the following equation satisfies θk=2πfk×(1/60).

$$\vartheta_k = -\frac{2\pi m}{N}k \quad (7)$$

An amplitude value of a flicker component depends on the accumulation time of the image sensor 101. Since the accumulation time of the image signal B and that of the image signal C are similar, the amplitude values can be regarded to have no variation between frames. Thus, a flicker component can be converted into a time domain by predicting phase components from among all flicker components detected in the image signal B by the amount indicated in equation (7) and by transforming the predicted phase components using inverse discrete Fourier transform.

Inverse discrete Fourier transform is represented by the following equation with a real part and an imaginary part of discrete Fourier transform (equation (4)).

$$x_n = \sum_{k=0}^{N-1}\left\{\text{Re}(\tilde{x}_k)\cos\left(\frac{2\pi n k}{N} + \vartheta_k\right) - \text{Im}(\tilde{x}_k)\sin\left(\frac{2\pi n k}{N} + \vartheta_k\right)\right\} \quad (8)$$

It is generally known that a flicker component is proportional to a signal strength of an object. In order to cancel a flicker to be generated in an image signal, a flicker component of a time domain calculated by the above equation, which is centered on 0 need to be changed to be centered on 1. Then, by obtaining the inverse number thereof, a correction value can be obtained. Then, multiplying an image signal by the generated correction value allows an image signal without any flicker to be generated.

On the other hand, referring again to FIG. 2, there is a timing when a correction value is generated based on a flicker component detected in the image signal C and a correction operation to the image signal D is executed. If a correction value is generated based on the flicker component detected from the image signal C having a shorter accumulation time and the correction value is applied to the image signal D having a longer accumulation time, as apparent from the signal level graphs 302 and 304 in FIGS. 3A and 3B, since amplitude values and phases of a flicker component are different from each other, a suitable correction operation cannot be executed.

Suitable correction can be executed on the image signal D by predicting an amplitude value and a phase based on the control information on the image sensor 101 output from the control unit 102 when the correction value is generated based on the detected flicker component.

Figure 4:
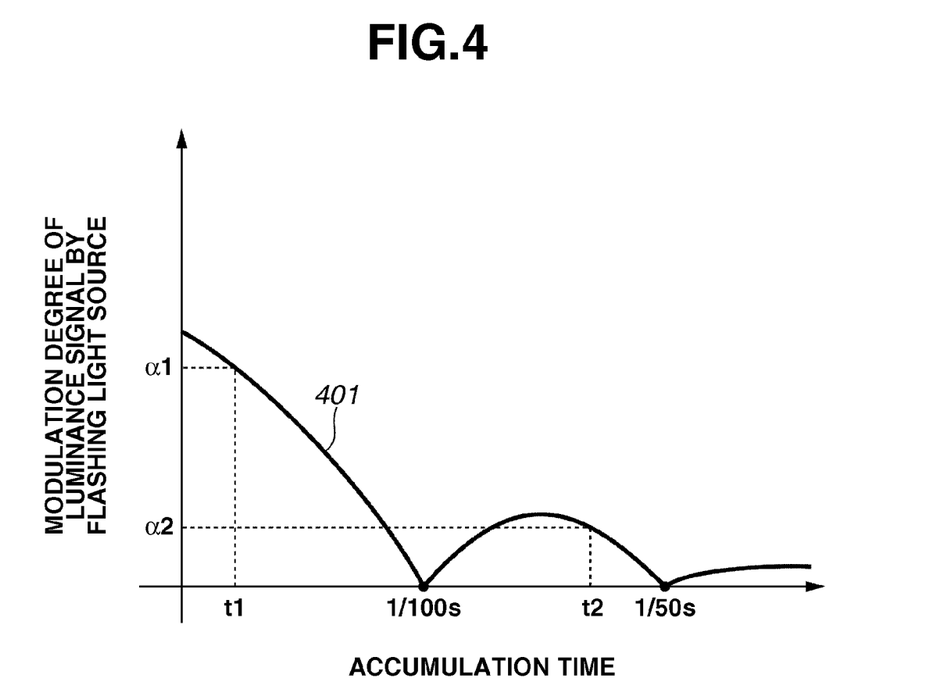
FIG. 4 is a schematic view illustrating a relationship between accumulation time and modulation of a luminance signal caused by a flashing light source according to the first exemplary embodiment.

A method for predicting a correction value will be described below. FIG. 4 illustrates a relationship between an accumulation time of the image sensor 101 and a modulation degree of a luminance signal caused by a flashing light source. The modulation degree is a value of a level variation (amplitude) when a flicker is generated by a flashing light source normalized by a signal level when a flicker is not generated.

A line 401 indicates a modulation degree of a signal level caused by a flicker for each accumulation time. As the accumulation time becomes shorter, the accumulation time of the light of a flashing light source becomes shorter too. Consequently, the variation of a signal level for each line becomes larger. Hence, the line 401 indicates the characteristics as shown in FIG. 4 due to the integration time and the cycle of a flashing light source.

The correction value prediction unit 104 has stored a table in advance concerning an accumulation time of the image sensor 101 and a modulation degree of a luminance signal caused by a flashing light source. The table can be stored as discretized characteristics of the line 401 shown in FIG. 4, which is measured beforehand, or can be stored by learning in the imaging apparatus.

When the accumulation time of the image sensor 101 is changed from t1 to t2, the correction value prediction unit 104 receives the accumulation time t2 of the image sensor 101 from the control unit 102, as control information of the image sensor 101, when an image signal to be corrected is accumulated. The correction value prediction unit 104 acquires a past modulation degree a1 at the accumulation time t1 and a modulation degree a2 at the accumulation time t2 received currently by referring to the table, and modulates a correction value determined by equation (8) by α2/α1 to generates a new correction value. Thereby, prediction of the amplitude of a correction value (correction parameter) can be obtained.

Figure 5:
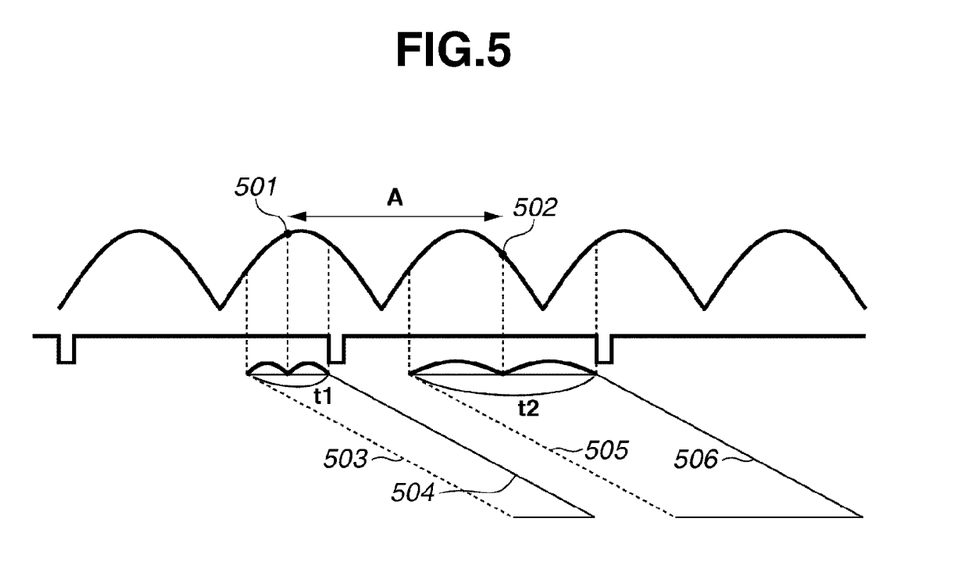
FIG. 5 is a timing chart illustrating a relationship between accumulation time and phase difference according to the first exemplary embodiment.

Referring to FIG. 5, a method for predicting a phase of a correction value will be described.

Driving 503 and driving 505 indicate driving to reset an electric charge accumulated on an electric charge conversion portion of the image sensor 101, and driving 504 and driving 506 indicate driving of reading. A time t1 between the driving 503 and the driving 504 and a time t2 between the driving 505 and the driving 506 indicate accumulation times. In order to calculate a phase difference in flicker components between the accumulation time t1 and the accumulation time t2, a time difference A between centers of gravity 501 and 502 of the accumulation times for accumulating a flashing light source is converted into phase information. When the cycle of a vertical synchronizing signal is 1/60 s, the time difference A is represented by the following equation:

$$A = \frac{1}{60} + \left(\frac{t1 - t2}{2}\right) \quad (9)$$

That is, the second term of equation (9) represents a phase difference of a flicker component generated due to a change in accumulation time. Thus, when a correction value is calculated, in addition to the phase difference θk of equation (7), a component of the second term of equation (9) is added as a phase difference component Φk due to a change in accumulation time, thereby allowing prediction of a phase to be performed.

The phase difference component Φk is represented by the following equation including k when the frequency fk calculated using equation (2) is fk=100 (Hz) and 1 provided when the phase difference component Φk satisfies Φk=2πfk×((t1−t2)/2).

$$\Phi_k = -\frac{2\pi l}{N}k \quad (10)$$

As described above, a correction value can be calculated by using the following equation according to equation (8) and equation (10) to predict a phase difference due to an accumulation time difference. Thus, a correction value can be obtained.

$$x_n = \sum_{k=0}^{N-1} \left\{ \begin{array}{l} \text{Re}(\tilde{x}_k)\cos\left(\frac{2\pi nk}{N} + \Phi_k + \vartheta_k\right) - \\ \text{Im}(\tilde{x}_k)\sin\left(\frac{2\pi nk}{N} + \Phi_k + \vartheta_k\right) \end{array} \right\} \quad (11)$$

An exemplary embodiment has been described in which detection and correction are executed using discrete Fourier transform and inverse discrete Fourier transform in the whole range of a frequency range which is determined by a sampling frequency fs. However, for example, referring to FIGS. 3A and 3B, it is understood that when the accumulation time is longer, the variation is roughly similar to a sine wave with a frequency, at which a flashing light source is emitting light. Accordingly, when a correction value is generated, the correction value is generated using the frequency fk of the generated flicker and Fourier series of a frequency of the vicinity thereof without executing inverse discrete Fourier transform over the entire frequency range, thereby allowing a sufficient correction value to be obtained.

On the other hand, if the accumulation time is becoming short, a flicker generated on a image signal becomes roughly similar to a light emission shape of a flashing light source. Thus, a flicker will be difficult to be approximated by a simple sine wave. Higher harmonic components are increased in the flicker. At this time, whether a flicker contains higher harmonic waves is determined according to the accumulation time which is control information of the image sensor 101 obtained from the control unit 102.

The correction value prediction unit 104 stores an accumulation time of the image sensor 101 and a modulation degree of a luminance signal caused by a flashing light source in a plurality of tables containing a higher harmonic waves in advance. When inverse discrete Fourier transform is performed to obtain a correction value, the correction value prediction unit 104 performs inverse discrete Fourier transform adding higher harmonic components by referring to a modulation degree from the table so as to contain higher harmonic components corresponding to the accumulation time. Even if a flicker containing a higher harmonic wave component is generated, by performing the processing described above, appropriate flicker correction can be realized.

As described above, even if a flicker component is abruptly changed due to a change in driving method of an image sensor, the flicker component can precisely be corrected and image quality can be enhanced.

Further, the present exemplary embodiment uses a complementary metal-oxide semiconductor (CMOS) image sensor, which employs an XY address type scanning method. However, the present exemplary embodiment can be applied to image sensors, which execute resetting and reading of all pixels at the same time as a charge-coupled device (CCD). In this case, a flicker appears as a variation of a periodic signal level between captured image signals. When the accumulation time of the image sensor 101 is changed, the accumulation time and the modulation degree of a luminance signal caused by a flashing light source are stored as a table, and a correction value is predicted and generated based on control information output from the control unit 102, thereby allowing appropriate flicker correction to be realized.

Figure 6:
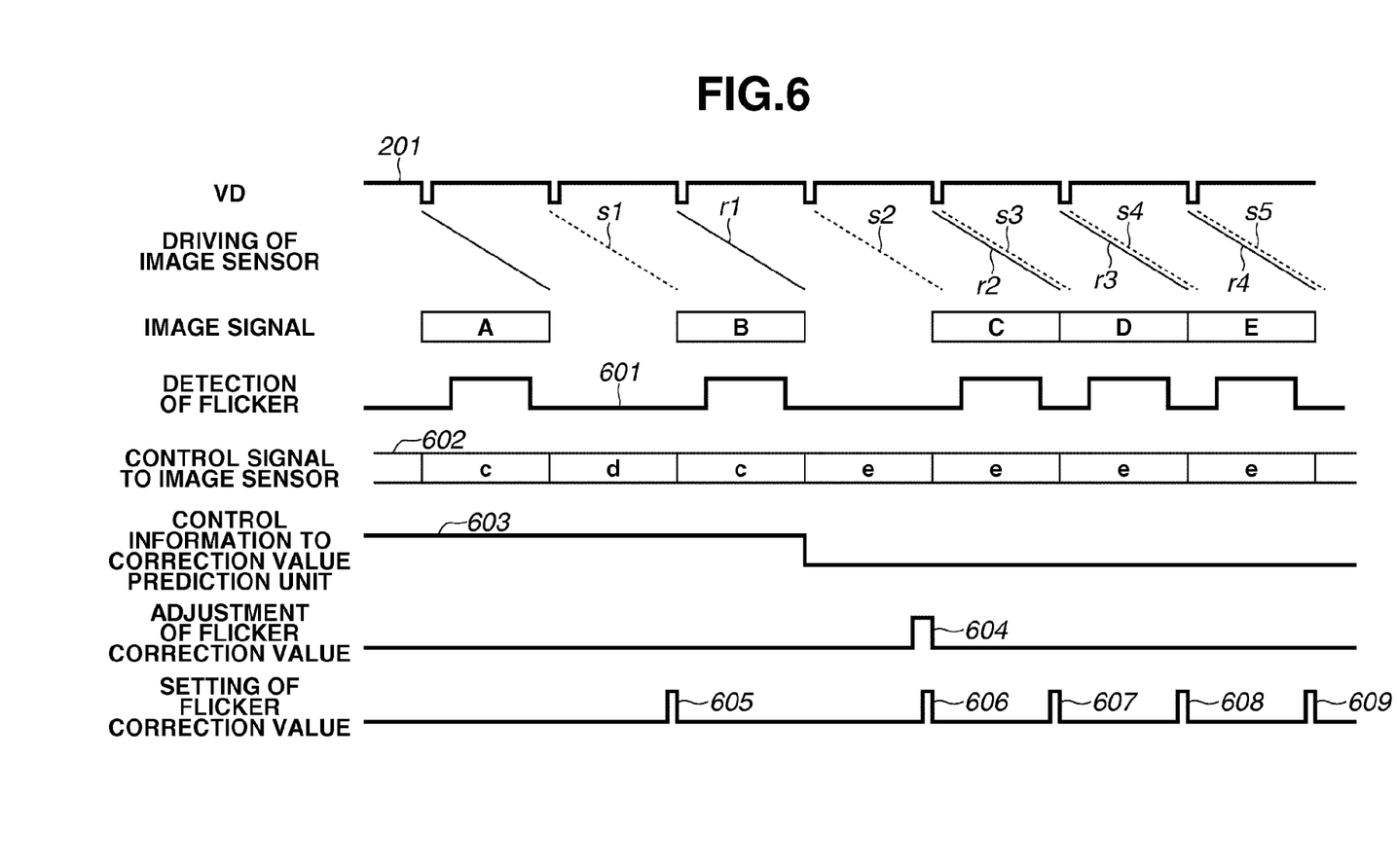
FIG. 6 is a timing chart illustrating the timing from flicker detection to flicker correction according to a second exemplary embodiment of the present invention.

Referring to FIG. 6, a timing chart according to a second exemplary embodiment of the present invention will be described below. Description is not repeated for those that are assigned the same reference numerals as those of the first exemplary embodiment. The second exemplary embodiment illustrates a method for detecting and correcting a flicker when an image signal, of which a flicker is corrected, has a delay by two vertical synchronizing signal periods relative to an image signal in which a flicker is detected.

Here, the case is described in which the image sensor 101 has changed the operation state from an intermittent reading operation to a normal reading operation. A timing chart 601 indicates the timing when the flicker detection unit 103 is operated. In the timing chart 601, the flicker detection unit 103 is operated in a part of a period when an image signal is obtained. In the intermittent reading operation, the image sensor 101 synchronizes with a vertical synchronizing period to determine frames to be read or not to be read. The intermittent reading operation is alternately repeated in a part illustrated in FIG. 6. In the normal reading operation an image signal is read from the image sensor 101 for each vertical synchronizing period. That is, the imaging apparatus is driven so as to change a frame rate.

Further, the intermittent reading operation and the normal reading operation will be described below when each accumulation time is not different. A control signal 602 is output from the control unit 102 to the image sensor 101. A control information signal 604 is output from the control unit 102 to the correction value prediction unit 104. The timing 604, when it is "high", indicates the timing when the correction value prediction unit 104 is operated, and timings 605 to 609, when they are "high", indicate the timing when a correction value generated by the correction value prediction unit 104 is set.

In this case, the timing of flicker detection and flicker correction always cause a delay of two vertical synchronizing periods between detection and correction, because flicker detection is executed from the image signal A and correction is executed on the image signal B, or flicker detection is executed from the image signal B and correction is executed on the image signal C. Thus, when the driving state of the image sensor 101 is changed, since an image signal to be detected is absent, a correction value cannot be obtained. Thus, correction to the image signal D cannot be performed. To solve this problem, the control unit 102 and the correction value prediction unit 104 execute a prediction for the image signal D at a timing that will be described below.

A control signal of the image sensor 101 is output from the control unit 102 to the image sensor 101 at a timing shown in the control signal 602. In the control signal 602, a signal c indicates a driving signal for driving the shutter without executing the reading drive, a signal d indicates a driving signal for executing reading drive without driving the shutter, and a signal e indicates a normal reading drive signal.

Here, when the driving state of the image sensor 101 is changed from intermittent reading to normal reading by the control unit 102, at timing shown in the control signal 602, the driving signal e is output to change the driving state of the image sensor 101. As shown in the control information signal 603, the driving state of the image sensor 101 is output, as control information, from the control unit 102 to the correction value prediction unit 104.

The control information includes information (in the present exemplary embodiment, high and low) for detecting a frame rate change. The correction value prediction unit 104 generates a correction value for the image signal C based on a flicker component detected by the flicker detection unit 102 from the image signal B. A phase of a flicker generated in a detection frame and a phase of a flicker generated in a correction frame have a fixed value at k provided when a frequency fk calculated by equation (2) is fk=100 (Hz) and m provided when a phase difference θk represented by equation (7) satisfies θk=2πfk×(1/30).

Further, assuming that the accumulation time of an image signal obtained from the image sensor 101 is not changed, an amplitude spectrum of a flicker is changed little. Thus, according to equation (8), a correction value for the image signal C is generated from a result detected from the image signal B and the correction value is set at a timing indicated by a timing signal 606.

In this way, after a correction value for the image signal C is generated, by receiving information indicating that the driving state of the image sensor 101 is changed (change from intermittent reading to normal reading) from the control information shown in the control information signal 603 and acquiring information beforehand that a correction value for the image signal D is missing due to the change of the driving state, a correction value for the image signal D is generated based on a flicker component detected from the image signal B and the control information signal 603 for controlling the image sensor 101 output from the control unit 102. A flicker component detected from the image signal B is continuously stored in a storage unit. When the control information output from the control unit 102 is changed, the control information is read from the storage unit. After a correction value for the image signal C is generated, a correction value for the image signal D is predicted and generated at a timing indicated by a timing signal 604. The generated correction value is set at a timing indicated by a timing signal 607 to correct the image signal D.

Next, a method for predicting a phase of a correction value to be executed in the correction value prediction unit 104 in the present exemplary embodiment will be described.

When an image signal to be corrected is delayed by two vertical synchronizing periods relative to an image signal from which a flicker is detected, as described above, a phase difference between a flicker in the detection frame and a flicker to be corrected in the correction frame has a fixed value at k provided when a frequency fk calculated by equation (2) is fk=100 (Hz) and m provided when a phase difference θk represented by equation (7) satisfies θk=2πfk×(1/30).

As in the present exemplary embodiment, when a correction value for correcting a flicker of the image signal D is generated from a result detected from the image signal B, a phase difference can be factored in the phase difference component Φk by one vertical synchronizing period. Then, the correction value has a fixed value at k provided when a frequency fk calculated using equation (2) is fk=100 (Hz) and 1 provided when the phase difference component Φk represented by equation (10) satisfies Φk=2πfk×(1/60). Therefore, a correction value is generated from equation (11), thereby allowing appropriate flicker correction to be realized.

Referring to the drawings, a third exemplary embodiment of the present invention will be described below. Since a block diagram of a flicker detection and correction apparatus is similar to that of the first exemplary embodiment, description is not repeated.

Next, referring to FIG. 7, a timing chart according to the third exemplary embodiment of the present invention will be described.

The present exemplary embodiment is an example of control for changing a driving method of an imaging method in order to capture a still image having higher definition than a moving image, for example, during capturing a moving image. For example, there is a method in which when a moving image is captured, in order to read the moving image at a high speed, an image is read from an image sensor by adding and averaging or thinning it. On the other hand, when a still image is captured, in order to read a high-definition image, an image is read using a readout time longer than that the time to be used for a moving image by reducing the number of adding and averaging or thinning operations than the number for a moving image, or by omitting addition.

Signal 701 is a vertical synchronizing signal which is determined according to an image capturing method of the imaging apparatus. In the case of an image sensor using an XY address type scanning method, since an exposure for each pixel is sequentially executed in the line direction, as illustrated in FIG. 7, all pixels of an image sensor are sequentially read within one vertical synchronizing signal period.

Reading drive of the image sensor 101 is represented by r1 to r6. Further, driving to reset an electric charge accumulated on an electric charge conversion portion of the image sensor 101 is represented by s1 to s6. In order to standardize an exposure time of each pixel, a resetting operation is also sequentially executed in the line direction similar to the reading operation.

Figure 7:
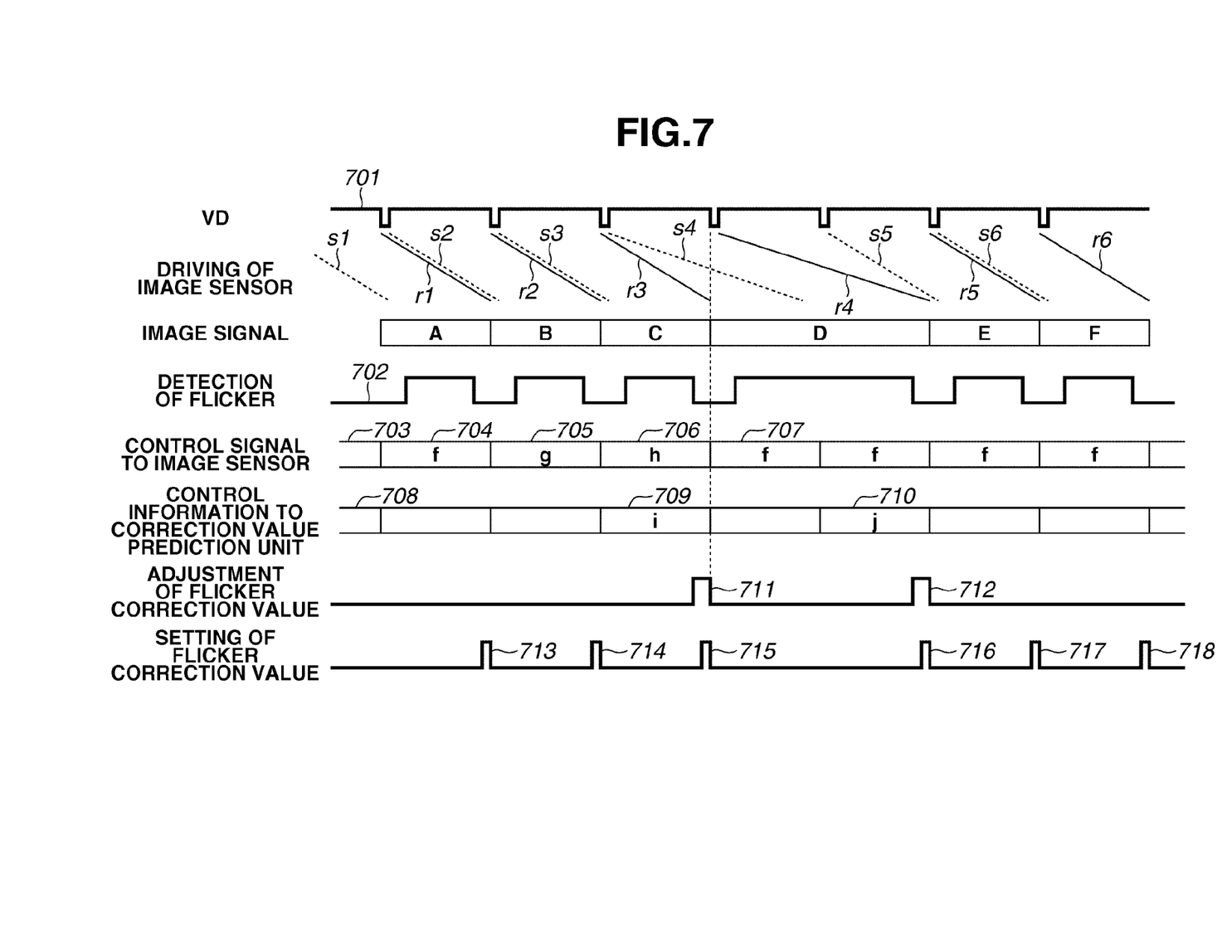
FIG. 7 is a timing chart illustrating the timing from flicker detection to flicker correction according to a third exemplary embodiment of the present invention.

As illustrated in FIG. 7, the reading time of r4 is longer than that of each of r1, r2, r3, r5, and r6. As described above, this represents that the reading time is changed due to a change in driving method of the image sensor, for example, by switching between image capturing of a moving image and a still image. An image signal read at timing r4 corresponds to an image signal D in FIG. 7, and image signals read at timings r1, r2, r3, r5, and r6 correspond to image signals A, B, C, E, and F, respectively.

Figure 8A:
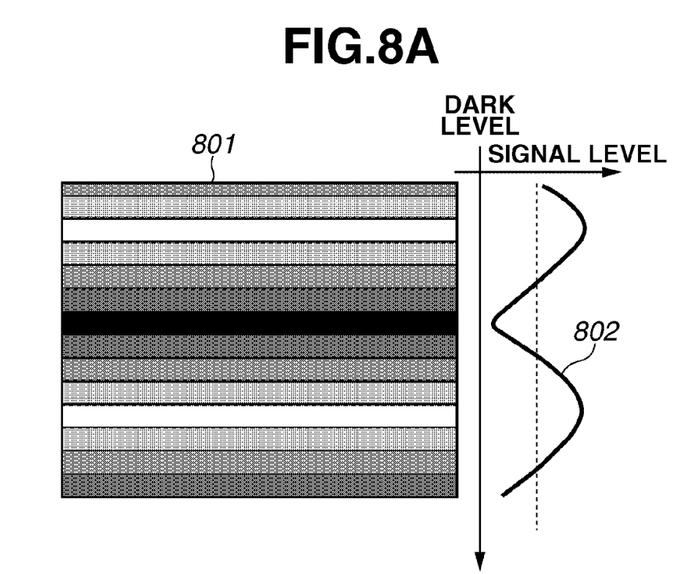
FIGS. 8A and 8B are schematic views illustrating the state of a flicker in an image signal due to a reading time difference according to the third exemplary embodiment.
Figure 8B:
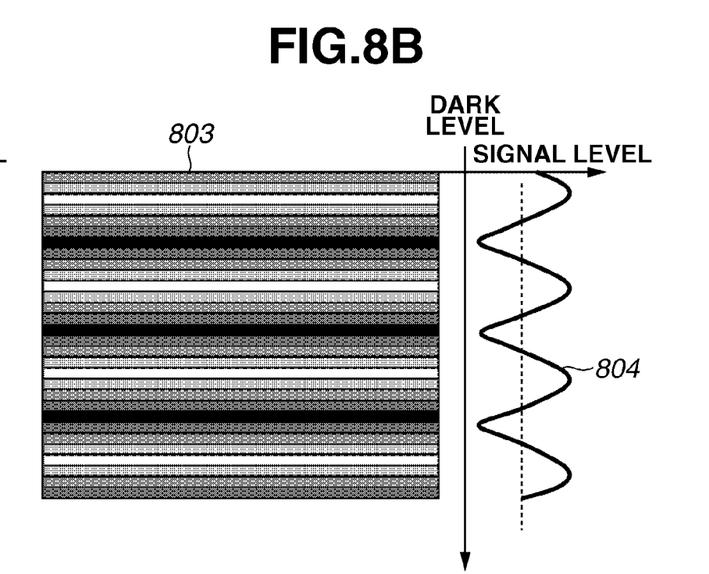

FIGS. 8A and 8B schematically illustrate an image signal captured by the image sensor 101. A state 801 illustrates a state of an image signal when the reading time for reading from the image sensor 101 is shorter during moving image capturing. A state 803 illustrates a state of an image signal when the reading time for reading from the image sensor 101 is longer during still image capturing. In fact, since the number of pixels to be read for each timing is different, the size of an image is different. However, in order to compare the cycle of a flicker at the same image angle for each case, the image signals are illustrated in the same size.

Since a signal level is modulated by a flashing light source, as shown in states 802 and 804, a periodic level variation depending on a light emission cycle of the flashing light source occurs in an image signal. If the light emission cycle of the flashing light source is constant, since the cycle of a level variation that appears in a screen depends on the reading time, the cycle of the level variation can be predicted by using reading time information as control information.

Referring back to FIG. 7, a control method will be described.

Timing 702 indicates the timing when a processing operation of the flicker detection unit 103 is executed. In timing 702, the flicker detection unit 103 executes a detection operation in a part of a period of time when an image signal is read. Timing 703 indicates the timing when the control unit 102 outputs a control signal for controlling the image sensor 101 thereto and is used to execute a driving method which affects the reading time, such as an adding, an averaging and a thinning method in an image sensor.

In the case of FIG. 7, for example, at timing 704, a control signal f for capturing the image signal C as a moving image is transmitted to the image sensor 101, and the image sensor 101 executes resetting and reading at timings s3 and r3, respectively. At timing 705, a control signal g for capturing the image signal D as a still image is transmitted to the image sensor 101, and the image sensor 101 executes resetting and reading at timings s4 and r4, respectively. At timing 706, a control signal f, which represents that driving is to be continued, is transmitted to the image sensor 101, and the image sensor 101 continues resetting and reading at timings s4 and r4, respectively. At timing 707, a control signal f for capturing an image signal E as a still image is transmitted to the image sensor 101, and the image sensor 101 executes resetting and reading at timings s5 and r5, respectively.

In the present exemplary embodiment, for image signals B, C, and F which are obtained when a moving image is captured, a correction value for each of the signals B, C, and F is generated from a flicker component obtained from image signals A, B, and E, respectively, which are captured just before image signals B, C, and F, respectively, and can be set at timings 713, 714, and 717.

For the image signal D obtained when a still image is captured, since the state of the flicker is different from that of the image signal C obtained just before the image signal D, a correction value is predicted from the flicker component obtained from the image signal C. Further, for an image signal E obtained when a moving image is captured, since the state of a flicker is different from that of the image signal D obtained just before the image signal E, a correction value is predicted based on a flicker component obtained from the image signal D.

Information 708 is control information that the control unit 102 transmits to the correction value prediction unit 104 and represents a ratio of reading time. At timing 709, a ratio of reading times r3 and r4 is transmitted as control information i, and at timing 710, a ratio of reading times r4 and r5 is transmitted as control information j. The correction value prediction unit 104 predicts a correction value at timings 711 and 712 based on a flicker component and control information, and sets a correction value at timings 715 and 716. In other fields, a correction value is calculated based on a flicker component to set a correction value.

Next, a method executed by the correction value prediction unit 104 will be described which predicts a correction value based on the flicker component obtained from the above-described flicker detection unit 103 and control information obtained from the control unit 102. A method that determines a correction value from a flicker component using inverse discrete Fourier transform to be represented by equation (8) is similar to the first exemplary embodiment.

If a reading time of a field 1 for reading from the image sensor 101 is provided by t1 and a reading time of another field 2 is provided by t2, a ratio of the cycle of a level variation, in a screen, of field 1 to field 2 is represented by a ratio of reading time T=t1/t2.

Thus, prediction of a correction value to a cyclic component can be performed using the above-described T as control information, more specifically, as represented by equation (12), by performing dividing processing for each term with T.

$$x_n = \sum_{k=0}^{N-1} \left\{ \begin{array}{l} \mathrm{Re}(\tilde{x}_k)\cos\left(\frac{1}{T} \times \frac{2\pi nk}{N} + \vartheta_k\right) - \\ \mathrm{Im}(\tilde{x}_k)\sin\left(\frac{1}{T} \times \frac{2\pi nk}{N} + \vartheta_k\right) \end{array} \right\} \quad (12)$$

As described above, even when a flicker component is abruptly changed due to a change in driving method of the imaging sensor 101, a flicker component can precisely be corrected and image quality can be enhanced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-340390 filed Dec. 28, 2007, which is hereby incorporated by reference herein in its entirety.

What is claimed is:

1. An image processing apparatus comprising:
a change unit configured to change a driving state of an image sensor for capturing an image signal in response to an operation for changing the driving state of the image sensor; and
a flicker correction unit configured to correct an image signal captured in a present driving state of the image sensor based on a flicker component detected from an image signal, which is captured in a previous driving state of the image sensor, of a frame captured a number of frames prior to the image signal,
wherein when the driving state of the image sensor changes from a driving state of a moving image capturing to a driving state of a still image capturing, and further changes to the driving state of the moving image capturing, the flicker correction unit corrects an image signal of a captured still image based on a flicker component detected from a predetermined number of frames prior to the captured still image, and corrects an image signal of a newly captured moving image based on a flicker component detected from the previously captured frame of the image signal in the driving state of the moving image capturing not using the captured still image.

2. An image processing apparatus comprising:
a change unit configured to change a driving state of an image sensor for capturing an image signal in response to an operation for changing accumulation time of the image sensor; and
a flicker correction unit configured to correct an image signal captured at a present accumulation time of the image sensor based on a flicker component detected from other image signals, which is captured at a previous accumulation time of the image sensor different from the present accumulation time, of a frame captured before the frame of the image signal to be corrected,
wherein the flicker correction unit generates a flicker correction value based on the difference of accumulation time by predicting amplitude or phase of the flicker component of the image signal captured at a present accumulation time of the image sensor.

3. A method comprising:
changing a driving state of an image sensor for capturing an image signal in response to an operation for changing the driving state of the image sensor;
correcting an image signal captured in a present driving state of the image sensor based on a flicker component detected from an image signal, which is captured in a previous driving state of the image sensor, of a frame captured a number of frames prior to the image signal; and
wherein when the driving state of the image sensor changes from a driving state of a moving image capturing to a driving state of a still image capturing, and further changes to the driving state of the moving image capturing, an image signal of a captured still image is corrected based on a flicker component detected from a predetermined number of frames prior to the captured still image, and an image signal of a newly captured moving image is corrected based on a flicker component detected from the previously captured frame of the image signal in the driving state of the moving image capturing not using the captured still image.

4. A method comprising:
changing an accumulation time of an image sensor for capturing an image signal in response to an operation for changing the accumulation time of the image sensor;
correcting an image signal captured at a present accumulation time of the image sensor based on a flicker component detected from other image signals, which is captured at a previous accumulation time of the image sensor different from the present accumulation time, of a frame captured before the frame of the image signal to be corrected,
wherein a flicker correction value is generated based on the difference of accumulation time by predicting amplitude or phase of the flicker component of the image signal captured at a present accumulation time of the image sensor.

5. The image processing apparatus according to claim 1, wherein the flicker correction unit corrects the newly captured moving image a number of frames more than the predetermined number prior to the newly captured moving image.

* * * * *